(12) United States Patent
Clark et al.

(10) Patent No.: US 8,544,380 B2
(45) Date of Patent: Oct. 1, 2013

(54) BEVERAGE BREWING SYSTEM INCLUDING A LIQUID MOVING ASSEMBLY

(75) Inventors: Charles H. Clark, Chatham, IL (US); Jamie D. Schroetlin, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 743 days.

(21) Appl. No.: 12/438,327

(22) PCT Filed: Aug. 23, 2007

(86) PCT No.: PCT/US2007/076680
§ 371 (c)(1),
(2), (4) Date: Apr. 19, 2010

(87) PCT Pub. No.: WO2008/024933
PCT Pub. Date: Feb. 28, 2008

(65) Prior Publication Data
US 2010/0203207 A1 Aug. 12, 2010

Related U.S. Application Data

(60) Provisional application No. 60/823,343, filed on Aug. 23, 2006.

(51) Int. Cl.
*A47J 31/00* (2006.01)

(52) U.S. Cl.
USPC .......................... 99/288; 99/302 R; 222/145.1

(58) Field of Classification Search
USPC ............ 99/288, 302 R; 222/145.1; 426/431, 426/433, 435, 437
See application file for complete search history.

(56) References Cited

U.S. PATENT DOCUMENTS

| | | | |
|---|---|---|---|
| 4,049,550 A * | 9/1977 | Obidniak | 210/244 |
| 4,143,589 A | 3/1979 | Weber | |
| 4,155,293 A * | 5/1979 | Spiel et al. | 99/352 |
| 4,919,041 A * | 4/1990 | Miller | 99/279 |
| 6,142,063 A | 11/2000 | Beaulieu et al. | |
| 6,481,339 B1 * | 11/2002 | Castleberry | 99/305 |
| 7,228,066 B2 * | 6/2007 | Pope | 392/441 |
| 2004/0238562 A1 * | 12/2004 | Mathues | 222/52 |
| 2007/0186780 A1 * | 8/2007 | Clark | 99/275 |

FOREIGN PATENT DOCUMENTS

WO     WO 98/13629     *  4/1998

OTHER PUBLICATIONS

International Search Report issued in PCT/US07/76680 (2008).

* cited by examiner

*Primary Examiner* — Anthony Weier
(74) *Attorney, Agent, or Firm* — Barnes & Thornburg LLP

(57) ABSTRACT

A brewing system uses a pressurizing apparatus for providing pressure to the system to controllably dispense heated water from the system for brewing. A method of brewing in which a pressurizing apparatus is associated with a water source, controllably pressurizing the water source, controllably dispensing by way of the pressurizing apparatus, water from the water source to use in a brewing process.

14 Claims, 3 Drawing Sheets

BEVERAGE BREWING SYSTEM INCLUDING A LIQUID MOVING ASSEMBLY

CROSS-REFERENCE TO RELATED PATENT APPLICATIONS

This patent application is a U.S. Nationalization of International Patent Application no. PCT/US2007/076680, filed Aug. 23, 2007, which claims the benefit of priority under 35 U.S.C. §119(e) to U.S. Provisional Application Ser. No. 60/823,343, file Aug. 23, 2006. The disclosures set forth in the referenced applications are incorporated herein by reference in their entireties, including all information as originally submitted to the United States Patent and Trademark Office.

BACKGROUND

The present disclosure relates to a brewing apparatus and system for producing food products which uses a heated water system. The brewing system uses a pressurizing apparatus that dispenses heated water from a heated water reservoir for producing beverage or other food product.

A variety of brewing systems heat water and dispense water to a brewing substance to produce a beverage. One form of brewed beverage dispensing system includes a rapid heating chamber in which unheated water is introduced into the rapid heating chamber whereupon it is rapidly heated and dispensed over ground coffee or other product for producing a brewed beverage.

Another form of brewing system includes a reservoir for retaining a quantity of heated water which is maintained generally at a heated temperature or within a temperature range for use in brewing on demand. In one example of this "on demand brewing system," water is introduced into a basin which is positioned above the heated water reservoir and communicates with the heated water reservoir. Water flows under force of gravity from the reservoir into the heated water reservoir. Generally, the water is introduced in the bottom of the reservoir where it tends to settle due to temperature differentials between an upper portion and a lower portion of the reservoir. Generally, when water is introduced into the heated water reservoir it displaces a quantity of heated water which is then dispensed through an outlet to a dispensing line onto ground coffee for producing a brewed coffee beverage. The flow of water into and out of the heated water reservoir is controlled by the volume of the water added to the reservoir and gravity or head pressure of the water in the basin.

Some brewing systems known as "siphon system brewers" are limited in that they can generally only operate at one flow rate, and provide one volume, that being the volume poured into the reservoir. In other words, water retained in the heated water reservoir is displaced by water poured into the reservoir. As the volume poured in displaces water, the volume displaced is generally equal to the volume poured. Moreover, the flow rate out of the heated water reservoir is set at a generally fixed flow rate and generally is not controllable nor variable.

In "siphon system brewers" the ability to control the water flow may be problematic because the water cannot be pulsed or turned on and off during the brewing process. Moreover, due to the operation of a "siphon system brewer" such pulsing or starting and stopping of the water flow may be impossible at lower volumes.

A system that includes a "dump valve" can be used to provide what is generically referred to in the brewing equipment industry as a pulse brew in which the water flow is turned on and off. This is accomplished by turning the "dump valve" on and off during the brewing process. However, the use of the valve may complicate the control logic for the machine. Additionally, such a brewer generally requires that a defined amount of head is provided to maintain a constant head pressure. Also, the dimensional and space requirements of the machine generally requires additional height of the machine to maintain a desired head pressure. The head pressure is established at a desirable level so as to provide accuracy in dispensing a pre-determined volume during the brewing process.

Additionally, the systems described above have generally smaller water dispensing passage ways. These passage ways are connected to the "heated" side of the brewer such that they dispense heated water from the heated water reservoir. These passage ways can accumulate lime or other material deposits as well as material flakes which otherwise deposit elsewhere in the system. The accumulation of these deposits or particles in the smaller passageways can reduce the flow rate from the desired levels as originally designed for operation of the system and can negatively influence the resulting product. With regard to beverages, the reduced flow rate can negatively influence the other flavor characteristics of the coffee.

SUMMARY

The system as disclosed herein uses a cold or unheated water reservoir, and a heated water reservoir. The unheated water reservoir is pressurized with a first pressurizing apparatus communicating with the unheated water reservoir. The first pressurizing apparatus may include an air pump, bladder or piston arrangement as well as other pressurizing apparatus currently existing or to be developed. The first pressurizing apparatus is controllable to push water from the unheated water reservoir to the heated water reservoir. As a result of the pressurization and displacement of the unheated water, heated water is then displaced and forced from the heated water reservoir. Heated water from the heated water reservoir is dispensed to the spray head and over the beverage brewing substance, such as coffee, for brewing.

In one embodiment, unheated water is introduced in a bottom portion of the heated water reservoir. The dispensing line connected to the spray head communicates with an upper portion of the heated water reservoir to allow heated water to exit near the top of the heated water reservoir. This configuration takes advantage of the stratification of different temperature water within the same reservoir to optimize the water temperature being dispensed from the heated water reservoir to the spray head. Additionally, the dispensing line is configured so that the spray head may be positioned or positionable above the pickup point for the dispensing line within the heated water reservoir.

In at least one embodiment, the pressurizing apparatus may include an air pump which is driven by a DC motor. Use of a DC motor provides one way to allow for control of the dispensing of water from the heated water reservoir. Controlled operation of the DC motor allows for different volumes and flow rates to be dispensed from the heated water reservoir. As a result, there may be more control to the beverage brewing process, by way of example but not limitation, the beverage may be brewed at different rates.

Also, this embodiment can produce a pulsing of water from the heated water reservoir to the beverage brewing substance. This can be used to control contact time with the beverage brewing substance to adjust the flavor profile of the finished beverage. The DC motor or other operation of the pressurized system such as the air pump can be controllably programmed to produce a desired recipe. In this embodiment, the absence of control valves and other devices between the heated water reservoir and the spray head may reduce the accumulation or accretion of lime or other minerals in this portion of brewing system. As such, cleaning devices such a brushes, springs or flexible shafts can be extended from the spray head through the dispense line to the reservoir thereby helping to further reduce lime or other mineral deposits which may accumulate and to allow for removal of cleaning of these deposits from the dispense line.

A vent is provided to allow removal of air from the heated water reservoir. Connected to the vent line is a second pressurizing apparatus. The second pressurizing apparatus operates to clear the vent line of moisture, lime, or other material before and after brewer operation.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
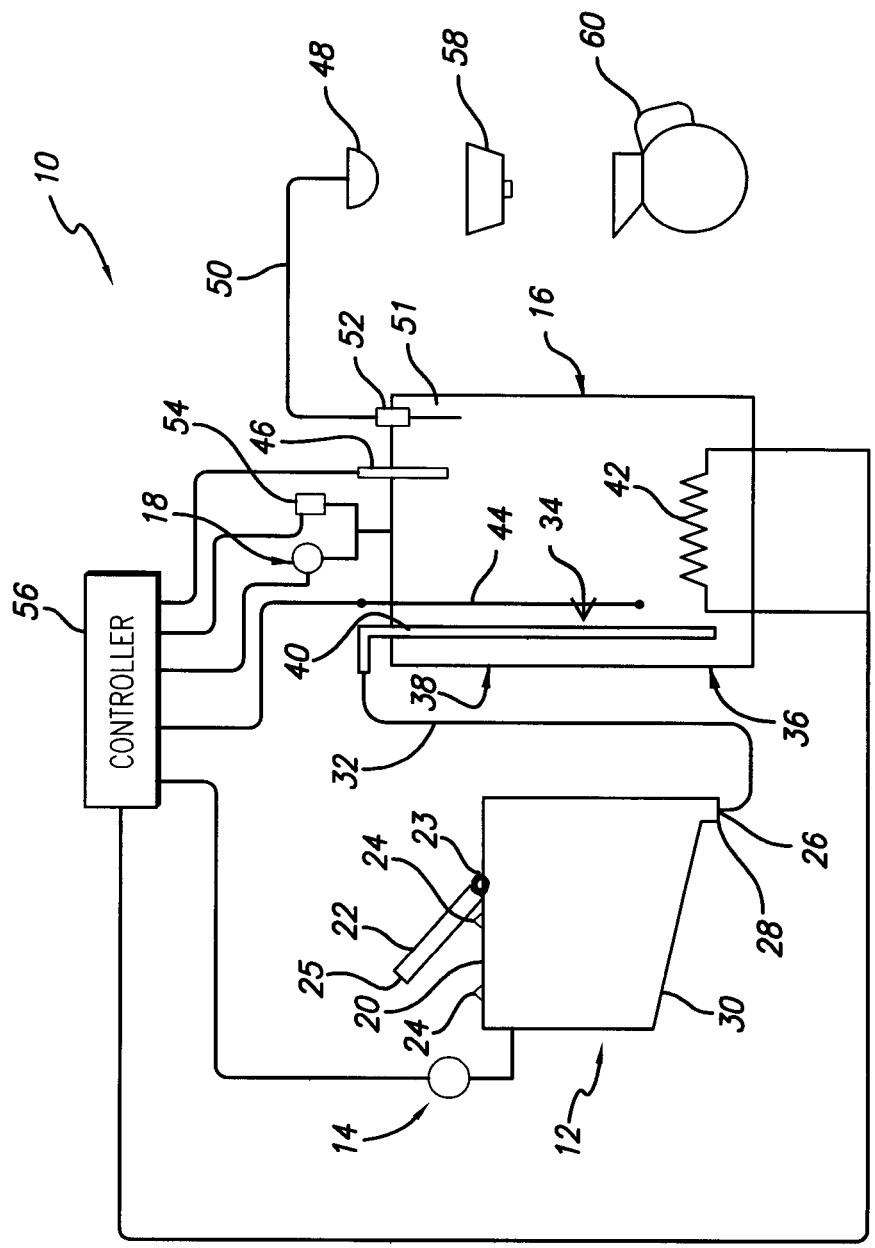
FIG. 1 is a schematic representation of an embodiment of a brewing system of the present disclosure.

The exemplification set out herein illustrates embodiments of the disclosure that is not to be construed as limiting the scope of the disclosure in any manner.

The exemplification set out herein illustrates embodiments of the disclosure that is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

FIG. 1 provides a general diagrammatic illustration relating to the present disclosure. This illustration is intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water, brewing liquid, or dilution liquid of any temperature. Generally the disclosure is presented in terms of heated water, but this term is intended to be broadly interpreted and to be inclusive and not exclusive. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated may be used in some embodiments to distinguish from the term unheated such as when unheated water is introduced into the unheated water reservoir during the brewing cycle. When water is heated it is done so in or near the heated water reservoir and as such the water is heated for use in the system. The terms heated water may be interpreted as hot water, and generally refers to adding energy to water to heat the water above ambient temperature.

Terms including beverage, brewed, brewing, and brewed beverage as may be used herein are used by way of example and not of limitation and are intended to be broadly defined and interpreted as including, but not limited to the brewing, making, or other wise producing of beverages such as coffee, tea and any other beverages or food substances that will benefit from the present disclosure. This broad interpretation is also intended to include, but is not limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include by way of illustration but not limitation, to beverage substances such as ground coffee, tea, herbs, botanicals, liquid beverage concentrate, powdered beverage concentrate, flaked, granular, freeze-dried or other forms of materials including liquid, gel, crystal or other form of beverage or food materials currently in existence or to be developed to obtain a desired beverage or food product. This broad interpretation is intended to include, without limitation, at least funnel and filter-type, packet or pouch-type, pod-type or other prepackaged or unpackaged forms of retaining and brewing a beverage or making of a food product.

While the disclosure shows an illustration of a brewer as described above, it is intended and understood that the term brewer is to be broadly interpreted to include brewers of any configuration including that as shown as well as, by way of example but not limitation, filter-type brewers, single cup brewers, and pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

The present disclosure is for a beverage brewing system 10 having a first reservoir 12, illustrated in the present embodiment as an unheated water reservoir 12, having at least a first pressurizing apparatus 14, and a heated water reservoir 16, and as shown in the illustrated embodiment, having a second pressurizing apparatus 18.

As illustrated in FIG. 1, the brewing system 10 of the present disclosure has the unheated water reservoir 12 controllably communicating with the first pressurizing apparatus 14. Unheated water reservoir 12 has an inlet 20 defined generally as a pour-in opening or mouth having a lid or cover 22. In at least one embodiment the inlet 20 has a rather large area opening to provide a large pouring target or wide pour-in point for pouring water into the unheated reservoir. The larger pouring target can be beneficial to help reduce spilling when filling the reservoir. The reservoir 12 has a finite volume and will provide a visual indication of when it is approaching a full volume such that the person filling the reservoir will see the water level approaching the inlet or mouth 20. This helps prevent overfill of the reservoir and overflowing the reservoir.

Lid 22 as shown in the figure is retained on the unheated water reservoir 12 with a hinge 23. In at least one embodiment the hinge, other connector or other associated connector can be configured to help maintain the lid in the open position. This may be useful to help improve the ease of use such as by eliminating the need to hold the tank open.

The lid 22 and reservoir 12 include a seal 24 disposed there between generally about inlet 20. The seal 24 is clamped between the lid and the inlet by a closure 25 to retain the lid over the inlet to help maintain pressure within unheated water reservoir 12. Generally, the lid is configured to position somewhat vertically over the seal to provide at least an approximation of a vertically engaged positioning with the seal. This helps to insure a relatively tight seal and secure engagement as well as enhancing seal life. While a wiping seal contact with the lid may be used, such an engagement may encounter more wear from use.

Figure 3:
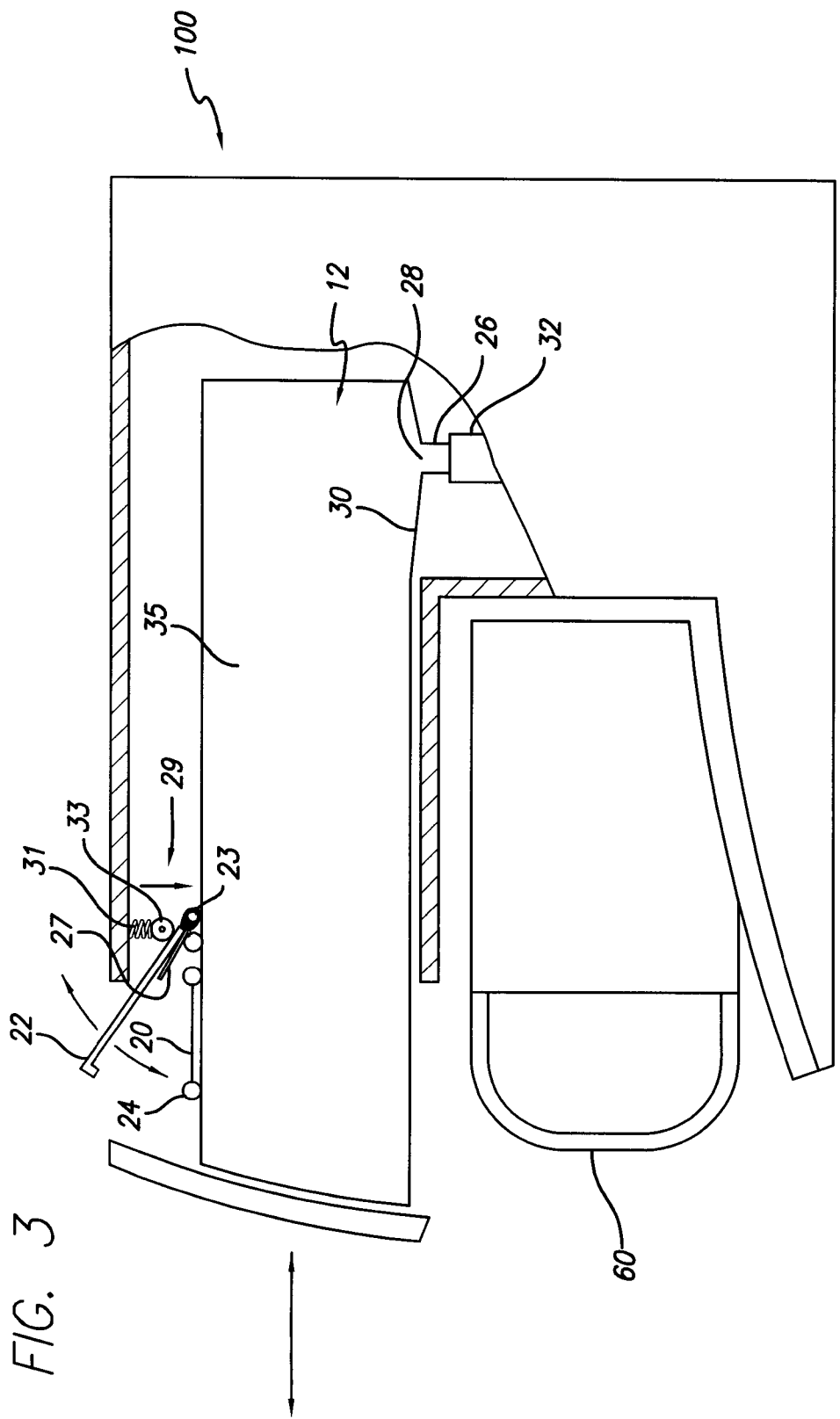
FIG. 3 is a partial cross section of a brewer embodying the disclosed brewing system, showing the operation and orientation of the reservoir and the associated lid carried on the reservoir.

As shown in FIG. 3, the reservoir 12 is shown a container having drawer-like characteristics. The reservoir 12 is positioned in a housing 100 of the brewer. The reservoir 12 generally encloses a cavity 35 having an outlet 26 and the inlet or mouth 20. The reservoir can be withdrawn from out of the housing for filling through the inlet and into the housing for brewing. As shown, a spring 27 loaded lid 22 is shown attached to the housing with the hinge 23 for moving the lid between an open position and a closed position. The spring or other form of biasing device 27 is provided to move the lid to and retain it in an open position. The spring loaded lid allows for a user to use a single hand to open the reservoir without having to separately open the lid. In other words, the lid pops up when the reservoir is withdrawn from the housing.

A closure device 29 is provided to assist in the closing of the lid against the spring force of the spring 27. In the illustrated embodiment, the closure device includes a roller 33 and a biasing device 31 providing a normally downward force on a corresponding surface of the lid. When the reservoir is slid to the fill position (out of the housing) the spring 27 acts to disengage the lid from the seal and raise the lid away from the opening 20. This provides an easily accessible target for filling the reservoir. When the reservoir is slid into the brew position (into the housing) the closure device acts against the lid to help close the lid over the opening and engage and retain the lid against the seal.

The outlet 26 is provided in the reservoir, generally at a low point 28 of a sloped bottom 30 which is provided to help fully drain the reservoir during each cycle. The reservoir is generally sized to hold the maximum amount of water matched to the largest amount of water needed brewing a full portion of brew to fill an associated container 60 such as a coffee carafe.

Figure 2:
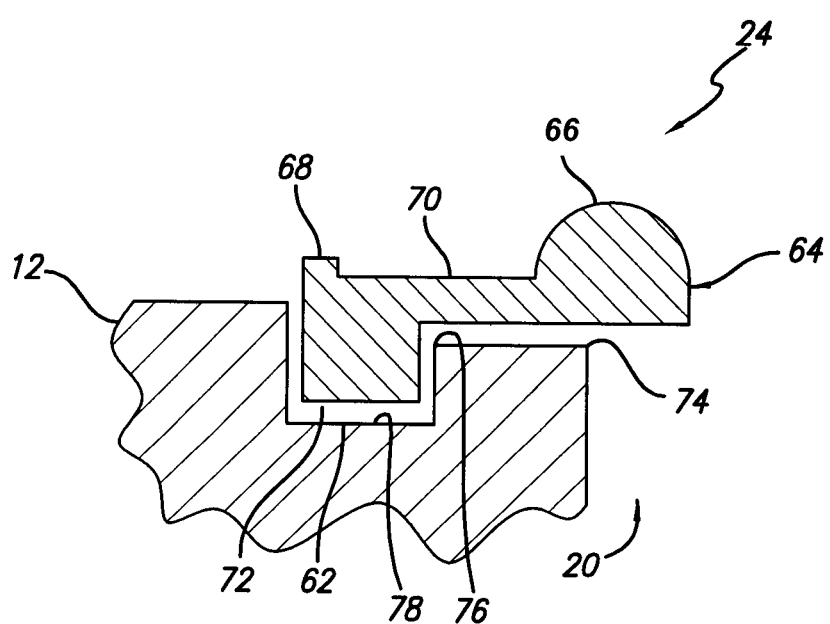
FIG. 2 is a cross section of a lid and seal for sealing a corresponding opening in a reservoir of the present disclosure.

As shown in FIG. 2, seal 24 is provided about the inlet 20 of the unheated water reservoir 12 and is configured to provide multiple sealing surfaces to provide a generally, if not substantially, air-tight seal between lid 22 and the unheated water reservoir 12. FIG. 2 shows a diagrammatic illustration of a cross section of the seal 24 and it is understood by one of ordinary skill in the art that the seal 24 will generally fit in the an annular groove 62 in a manner that will generally retain the seal 24 in the groove 62. In other words, generally it is expected that at least some of the outside surfaces of seal will contact the internal surfaces of the groove.

In an illustrative embodiment, seal 24, has a gasket 64 within an annular groove 62 disposed about inlet 20. Gasket 64 has an inner rib 66, an outer rib 68, a flange 70 disposed between inner rib 66 and outer rib 68, and a tongue 72 for cooperation with groove 62. Inner rib 66 is higher than outer rib 68, such that as lid 22 is closed, lid 22 will contact inner rib 66, deflecting the gasket against the edge of inlet 20, forming a first sealing surface 74. As lid 22 continues to close, flange 70 is pressed against second sealing surface 76. When lid 22 is fully closed, tongue 72 is pressed into groove 62 and against third sealing surface 78. The gasket 64 provides multiple sealing points to improve the reliability of the system. Multiple sealing points or areas help provide redundancy, in the event one sealing area fails there is a likelihood that another sealing area will help maintain the desired sealing characteristics. In at least one embodiment gasket 64 is formed from a resilient elastomeric material having a durometer value of at least 30, such as rubber, polyethylene, silicone, neoprene, or other suitable material, by way of example but not limitation, food grade plastic material.

Referring again to FIG. 1, outlet 26 of unheated water reservoir 12 is connected to and communicates with the heated water reservoir 16 by a fluid conduit 32. Fluid conduit 32 is connected to and communicates with a drop tube 34 extending to a lower portion 36 of heated water reservoir 16. The drop tube or down tube 34 has a small hole as a vent 40 located at an upper portion thereof. Drop tube 34 delivers unheated water to a bottom portion 36 of unheated water reservoir 16. The unheated water, having a greater density than heated water, generally remains near the bottom portion 36 while displacing an equal volume of heated water from an upper portion 38 of the heated water reservoir 16 through dispensing line 50. The open end of dispensing line 50 within heated water reservoir 16 is referred to as the pickup point 51, and generally is oriented above the level of the inlet 20 of the unheated water reservoir and below the level of spray head 48.

Positioned at least proximate to, either externally or internally to the heated water reservoir is a heating device or element 42 operatively coupled to a controller 56. The heating element 42 helps to provide energy to the water in the reservoir to controllably increase the temperature of the water used in the brewing process. Heated water reservoir also has a temperature probe 44 and a level probe 46. the probes 44, 46 are operatively coupled to the controller 56. While an electric heating element is generally illustrated, any form of internal or external device may be used to add energy to the water in the reservoir 16.

Spray head 48 is connected to and communicates with the heated water reservoir 16 by a dispenser tube 50 that is connected to heated water reservoir by connector 52. Connector 52 may be a siphon hub or grommet with the dispensing line 50 extending below connector 52 to the pickup point 51 within the heated water reservoir. Dispensing line 50 may be inclined such that spray head 48 can be positioned above the level of pickup point 51, which is above the level of the unheated water inlet 20. Having the spray head 48 above the level of the connection with the heated water reservoir 16 alleviates unwanted siphon action and also provides a space for the expansion of water as it is heated at the end of brewing cycle without the expanding water dripping out through the spray head. Because the inclined dispensing line alleviates unwanted siphon action, a plain flow-through connector 52 such as a grommet may be used. However, a siphon hub or check-valve may also be used as connector 52 to provide additional redundant protection against siphon action. Not using a valve in the line 50 will allow a user to clean the line 50 of lime or other mineral deposits with our interference such as by use of a deliming rod or spring. However, the valve may be used if desired.

A controllable vent 54, operatively coupled to the controller 56, is provided on heated water reservoir 16 to allow the escape of air so that heated water is allowed to flow into dispenser tube 50. A second pressurizing apparatus 18, operatively coupled to the controller 56, is connected to and communicates with the vent 54 and is configured to purge vent 54 before and after a brew cycle. While the apparatus and vent are shown in FIG. 1 as being near an upper portion of the reservoir, the apparatus and vent can be positioned away from the upper portion of the reservoir. One reason to space the apparatus and vent away from the upper portion of the reservoir is to reduce the heat that might otherwise, potentially adversely, effect the operation of the apparatus and vent. Also, if vent 54 becomes obstructed, air could be trapped within heated water reservoir 16 preventing operation of the brewing system 10. In the event that vent 54 becomes obstructed, trapping air within heated water reservoir 16, the brewing system 10 will begin operation, but controller 56 will receive a "wet" signal from level probe 46, which will cause controller 56 to stop operation after about thirty seconds.

Unheated water reservoir 12 is sized to hold a maximum volume available in container 60 to prevent overfilling and overflow. Water is poured into inlet 20 and lid 22 is closed and secured against seal 24. When a user presses the start button, or begins the brewing process or cycle, the first pressurizing apparatus 14 turns on and begins pressurizing unheated water reservoir 12, in at least one embodiment, initially with vent 54 in the open position. At this point in the brew cycle the level probe reads low water or dry. Also, after the start of the cycle, in at least one embodiment the second pressurizing apparatus 18 may be operated for a period of time, for example 5 seconds. Air from the second apparatus flows through the vent line and vent valve and into the heated water reservoir. The second apparatus turns off and remains off for the remainder of the brewing cycle.

As first pressurizing apparatus 14 pressurizes unheated water reservoir 12, water is forced through fluid conduit 32 and drop tube 34 into the lower portion 36 of heated water reservoir 16 displacing the heated water and causing the water level in the heated water reservoir 16 to rise. The first pressurizing apparatus is the primary motive force or engine that drive the water flow in the brew cycle. When the water level in the reservoir 16 reaches the level probe 46 the probe sends a "wet" signal to controller 56 which controls the vent 54 to the closed position. With vent 54 closed, water is forced through fluid passage 50 and flows out of spray head 48 and into receptacle 58, and container 60. The receptacle 58 retains a quantity of beverage making substance for mixing with the water, by way of example but not limitation, brewing such as occurs when heated water is mixed with ground coffee.

When unheated water reservoir 12 empties, the pressure will continue to force water from the heated water reservoir 16 and the water level will drop below level probe 46 producing a "dry" signal. After the controller 56 receives the "dry" signal, the first pressurizing apparatus 14 continues to operate for about ten seconds causing the water level to drop below the pickup point 51 for the dispensing line 50.

In one embodiment, this would indicate the end of the brewing cycle. The water which was poured into the reservoir 12 was driven by pressurization of the reservoir 12 by the pump 14 thought the line 32 to displace an equal volume of water from the second reservoir 16. While this may be a simplified version of the system, it will provide the general primary functions of the system.

In another embodiment, as generally illustrated, after first pressurizing apparatus 14 shuts off, controller 56 opens vent 54 and starts second pressurizing apparatus 18. Second pressurizing apparatus 18 runs for about five seconds, purging vent 54 of water, moisture, lime or other minerals or material. At the end of the cycle the second pressurizing apparatus 18 shuts off with the vent 54 remaining open.

As the water in heated water reservoir 16 reheats, the water expands. The specific amount of expansion depends on the inlet water temperature, the and the amount of heated water displaced by the previous brew. When the water is fully heated, the level of the water in the heated water reservoir 16 may be above the level of the pickup point 51 of dispenser tube 50. However, because dispenser tube 50 is inclined with spray head 48 above the top of heated water reservoir 16, the water is able to expand into dispenser tube 50 without flowing out of the spray head 48. Also, the vent 54 is open to prevent pressure.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains. build up in the reservoir.

The invention claimed is:

1. A liquid moving assembly for use in combination with a beverage preparation apparatus, the liquid moving assembly comprising:
   a first reservoir for receiving a predetermined volume of liquid dispensed therein by a user;
   a second reservoir for containing liquid and communicating with the first reservoir, the second reservoir receiving the predetermined volume of liquid from the first reservoir and communicating with a dispense line for controllably dispensing liquid to a receptacle which retains a quantity of beverage making substance;
   at least a first controllable pressurizing apparatus communicating with the first reservoir;
   a controller operatively coupled to the pressurizing apparatus for controllably pressurizing the first reservoir to drive the predetermined volume of liquid from the first reservoir to the second reservoir for displacing a corresponding volume of liquid to the dispense line; and
   the first reservoir being configured for movement into and out of a housing of the beverage preparation apparatus, the reservoir being positionable out of the housing for receiving liquid therein and being positionable into the housing to sealing the reservoir for pressurization.

2. The liquid moving assembly of claim 1 further comprising,
   a heating device operatively associated with at least the second reservoir for heating liquid contained in the second reservoir.

3. The liquid moving assembly of claim 2, wherein the heating device is operatively coupled to and controllable by the controller.

4. The liquid moving assembly of claim 1 further comprising, an inlet defined in the first reservoir for receiving water there through, a lid operatively associated with the opening to seal the opening against pressurization.

5. The liquid moving assembly of claim 4, wherein the lid is retained on the first reservoir with a hinge.

6. The liquid moving assembly of claim 5, further comprising a biasing device coupled to the lid for biasing the lid in a normally open position.

7. The liquid moving assembly of claim 1, further comprising an inlet opening defined in the first reservoir for receiving water there through, a lid operatively associated with the opening to seal the opening against pressurization, a biasing device coupled to the lid for biasing the lid in a normally open position.

8. The liquid moving assembly of claim 1, further comprising an inlet opening defined in the first reservoir for receiving water there through, a lid operatively associated with the opening, a biasing device coupled to the lid for biasing the lid in a normally open position, the lid moving to the open position when the reservoir is moved out of the housing with the lid disengaging the seal with the reservoir and exposing the opening for filling the reservoir, and the lid moving to the closed position for sealing the opening against pressurization when the reservoir is moved into the housing.

9. The liquid moving assembly of claim 1, further comprising an inlet opening defined in the first reservoir for receiving water there through, a lid operatively associated with the opening to cover the opening against pressurization, a seal retained on at least one of the reservoir and lid for sealing the lid against the reservoir for pressurization of the reservoir.

10. A beverage brewing system comprising:
a receptacle for retaining beverage preparation substance;
a first reservoir for receiving a predetermined volume of water dispensed therein by a user;
a second reservoir for containing water and communicating with the first reservoir, the second reservoir receiving the predetermined volume of water from the first reservoir;
a dispense line communicating with the second reservoir for dispensing water to the receptacle;
at least a first controllable pressurizing apparatus communicating with the first reservoir; and
a controller operatively coupled to the pressurizing apparatus for controllably pressurizing the first reservoir to controllably drive the predetermined volume of water from the first reservoir to the second reservoir for displacing a corresponding volume of water to the dispense line;
the first reservoir being configured for movement into and out of a housing of the beverage brewing system, the reservoir being positionable out of the housing for receiving liquid therein and being positionable into the housing to sealing the reservoir for pressurization.

11. The beverage brewing system of claim 10 further comprising a heating device coupled to the controller and operatively associated with at least the second reservoir for heating liquid contained in the second reservoir.

12. The beverage brewing system of claim 10, further comprising an inlet opening defined in the first reservoir for receiving water there through, a lid operatively associated with the opening to seal the opening against pressurization, a biasing device coupled to the lid for biasing the lid in a normally open position.

13. The beverage brewing system of claim 10, further comprising an inlet opening defined in the first reservoir for receiving water there through, a lid operatively associated with the opening, a biasing device coupled to the lid for biasing the lid in a normally open position, the lid moving to the open position when the reservoir is moved out of the housing with the lid disengaging the seal with the reservoir and exposing the opening for filling the reservoir, and the lid moving to the closed position for sealing the opening against pressurization when the reservoir is moved into the housing.

14. The beverage brewing system of claim 10, further comprising an inlet opening defined in the first reservoir for receiving water there through, a lid operatively associated with the opening to cover the opening against pressurization, a seal retained on at least one of the reservoir and lid for sealing the lid against the reservoir for pressurization of the reservoir.

* * * * *